United States Patent
Jones et al.

(10) Patent No.: US 9,310,466 B2
(45) Date of Patent: Apr. 12, 2016

(54) METHOD AND APPARATUS PERTAINING TO THE IDENTIFICATION OF PHYSICAL-LOCAL DISCREPANCIES IN STATISTICS-BASED RFID-TAG INFORMATION

(71) Applicant: Wal-Mart Stores, Inc., Bentonville, AR (US)

(72) Inventors: Nicholaus A. Jones, Fayetteville, AR (US); Jie Ouyang, Auburn Hills, MI (US)

(73) Assignee: Wal-Mart Stores, Inc., Bentonville, AR (US)

( * ) Notice: Subject to any disclaimer, the term of this patent is extended or adjusted under 35 U.S.C. 154(b) by 228 days.

(21) Appl. No.: 13/826,442

(22) Filed: Mar. 14, 2013

(65) Prior Publication Data
US 2014/0266608 A1    Sep. 18, 2014

(51) Int. Cl.
| G08B 5/22 | (2006.01) |
| G08B 25/00 | (2006.01) |
| H04Q 5/22 | (2006.01) |
| G08B 13/14 | (2006.01) |
| G08B 1/08 | (2006.01) |
| G06F 19/00 | (2011.01) |
| G06Q 30/00 | (2012.01) |
| G06Q 90/00 | (2006.01) |
| G06G 1/14 | (2006.01) |
| G06Q 20/00 | (2012.01) |
| G06Q 10/00 | (2012.01) |
| G01S 5/14 | (2006.01) |
| G06Q 10/08 | (2012.01) |

(Continued)

(52) U.S. Cl.
CPC ............... *G01S 5/14* (2013.01); *G06K 7/10099* (2013.01); *G06K 7/10475* (2013.01); *G06Q 10/08* (2013.01); *G06Q 10/087* (2013.01); *G06K 7/0008* (2013.01); *G06K 2017/0045* (2013.01); *G06K 2017/0051* (2013.01)

(58) Field of Classification Search
None
See application file for complete search history.

(56) References Cited

U.S. PATENT DOCUMENTS

| 6,026,378 A | 2/2000 | Onozaki |
| 6,496,806 B1 | 12/2002 | Horwitz |

(Continued)

OTHER PUBLICATIONS

U.S. Appl. No. 13/803,765, Mar. 14, 2013, Ouyang.

(Continued)

*Primary Examiner* — Mohamed Barakat
(74) *Attorney, Agent, or Firm* — Fitch, Even, Tabin & Flannery LLP (57) ABSTRACT

These teachings are suitable for use in conjunction with a process having access to both coverage information that maps the coverage area for each of a plurality of RFID-tag readers to physical locations within a given monitored facility and historical-read information for a population of RFID tags, and that uses that historical-read information and that coverage information to automatically determine the physical location of RFID tags. In particular, these teachings generally provide for accessing supplemental information regarding physical locations for at least some of those RFID tags and then comparing the automatically-determined physical location information with the supplemental information to thereby identify physical-location discrepancies. By one approach those physical-location discrepancies are used to adjust the automated process by which the automatically-determined physical location information is automatically determined to thereby improve accuracy of the automated process.

11 Claims, 4 Drawing Sheets

(51) Int. Cl.
*G06K 7/10* (2006.01)
*G06K 7/00* (2006.01)
*G06K 17/00* (2006.01)

(56) References Cited

U.S. PATENT DOCUMENTS

| | | | |
|---|---|---|---|
| 6,684,980 B2 | 2/2004 | Hungerford, III | |
| 6,897,763 B2 | 5/2005 | Schulmerich | |
| 7,243,001 B2 | 7/2007 | Janert | |
| 7,486,188 B2 | 2/2009 | Van Alstyne | |
| 8,077,041 B2 * | 12/2011 | Stern et al. | 340/572.1 |
| 8,102,264 B2 * | 1/2012 | Rinkes et al. | 340/572.1 |
| 8,120,469 B2 | 2/2012 | Adamee | |
| 8,154,408 B2 | 4/2012 | Spindel | |
| 8,321,302 B2 | 11/2012 | Bauer | |
| 8,321,303 B1 | 11/2012 | Krishnamurthy | |
| 8,332,656 B2 | 12/2012 | Jones | |
| 8,669,915 B2 | 3/2014 | Wilkinson | |
| 2005/0021561 A1 * | 1/2005 | Noonan | 707/104.1 |
| 2007/0073513 A1 | 3/2007 | Posamentier | |
| 2007/0090951 A1 * | 4/2007 | Chan et al. | 340/572.1 |
| 2008/0100445 A1 | 5/2008 | Horwitz | |
| 2008/0150692 A1 | 6/2008 | Missimer | |
| 2008/0319575 A1 | 12/2008 | Vahlberg | |
| 2009/0231135 A1 | 9/2009 | Chaves | |
| 2010/0164694 A1 | 7/2010 | Matsubara | |
| 2011/0276382 A1 | 11/2011 | Ramchandani | |
| 2012/0086553 A1 | 4/2012 | Wilkinson | |
| 2012/0086554 A1 | 4/2012 | Wilkinson | |
| 2012/0161967 A1 | 6/2012 | Stern | |
| 2012/0161968 A1 * | 6/2012 | Bodapati et al. | 340/572.1 |
| 2012/0235817 A1 | 9/2012 | Forster | |
| 2013/0027191 A1 | 1/2013 | Wilkinson | |
| 2013/0093591 A1 | 4/2013 | Campero | |
| 2014/0035724 A1 | 2/2014 | Rothschild | |
| 2014/0266615 A1 | 9/2014 | Ouyang | |
| 2014/0266616 A1 | 9/2014 | Jones | |
| 2014/0266618 A1 | 9/2014 | Jones | |

OTHER PUBLICATIONS

U.S. Appl. No. 13/804,772, Mar. 14, 2013, Jones.
U.S. Appl. No. 13/826,302, Mar. 14, 2013, Jones.
EPCGLOBAL; 'EPC(TM) Radio-Frequency Identity Protocols Class-1 Generation-2 UHF RFID Protocol for Communications at 860 MHz-960 MHz Version 1.0.9;' Specification for RFID Air Interface by EPCglobal Inc.; 94 pages, Jan. 2005.
PCT; App. No. PCT/US2014/025556; International Search Report mailed Aug. 5, 2014.
PCT; App. No. PCT/US2014/025556; Written Opinion mailed Aug. 5, 2014.

* cited by examiner

METHOD AND APPARATUS PERTAINING TO THE IDENTIFICATION OF PHYSICAL-LOCAL DISCREPANCIES IN STATISTICS-BASED RFID-TAG INFORMATION

TECHNICAL FIELD

This disclosure relates generally to the use of radio-frequency identification (RFID) tags.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

There are proposals to utilize RFID tags to uniquely identify individual items. The Electronic Product Code (EPC) as managed by EPCGlobal, Inc. represents one such effort in these regards. EPC-based RFID tags each have a unique (within the EPC universe) serial number to thereby uniquely identify each tag and, by association, each item associated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 is hereby fully incorporated herein by this reference.)

In some cases a system designer will seek to provide more-or-less ubiquitous coverage through a given facility (such as a retail store) and thereby have the theoretical ability to read an RFID tag regardless of where that tag might be located within the facility. By one approach, for example, a plurality of RFID-tag readers may hang suspended from the ceiling of the monitored facility. Examples in such regards can be found, for example, in U.S. patent application Ser. No. 12/900,191, entitled METHOD AND APPARATUS PERTAINING TO RFID TAG READER ANTENNA ARRAY, the contents of which are also fully incorporated herein by this reference.

Unfortunately, while it can be very helpful to read a particular RFID tag to thereby gain its tag-specific information, to a very large extent the system can remain quite effectively blind to the physical location of that RFID tag within the monitored facility (as the RFID tag itself has no such physical-location information to impart). This lack of useful information regarding physical location becomes even more acute when taking into account the fact that coverage areas for different RFID-tag readers can and will overlap.

BRIEF DESCRIPTION OF THE DRAWINGS

The above needs are at least partially met through provision of the method and apparatus pertaining to the identification of physical-local discrepancies in statistics-based RFID-tag information described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these teachings are suitable for use in conjunction with a process having access to both coverage information that maps the coverage area for each of a plurality of RFID-tag readers to physical locations within a given monitored facility and historical-read information for a population of RFID tags, and that uses that historical-read information and that coverage information to automatically determine the physical location of RFID tags. In particular, these teachings generally provide for accessing supplemental information regarding physical locations for at least some of those RFID tags and then comparing the automatically-determined physical location information with the supplemental information to thereby identify physical-location discrepancies. By one approach those physical-location discrepancies are used to adjust the automated process by which the automatically-determined physical location information is automatically determined to thereby improve accuracy of the automated process.

These teachings are highly flexible in practice and will accommodate a variety of approaches as regard the foregoing actions. For example, the aforementioned supplemental information can comprise one or more of a floor plan-based planogram for at least part of the given facility, information gleaned from handheld-based RFID-tag readers, information gleaned from handheld-based optical-code readers, information gleaned from video analytics, and/or information received through location reviewed from customers of the facility, to note but a few possibilities in these regards.

These teachings can be particularly helpful in application settings that involve tens of thousands (or even hundreds of thousands) of RFID tags within a given monitored facility. In particular, these teachings can be readily leveraged in a variety of ways to compensate for an inability to read all RFID tags all the time and also to help leverage as well as disambiguate location information that can arise from application settings that employ a plurality of RFID-tag readers having at least partially overlapping coverage areas. Those skilled in the art will further appreciate that improving a statistics-based process for correlating RFID tags with a physical location per these teachings can offer a considerable increase as regards the reliability of physical location conclusions that are based upon RFID-tag reads.

Figure 1:
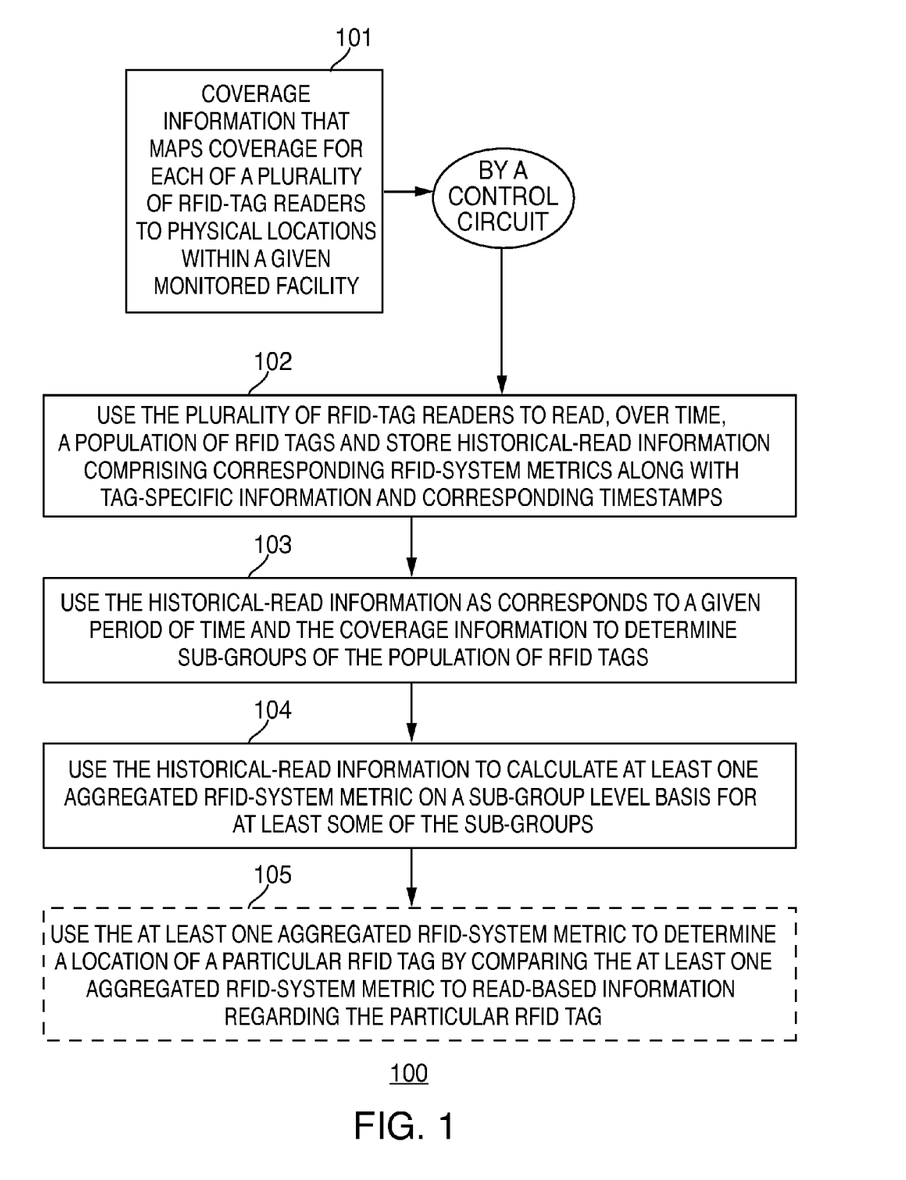
FIG. 1 comprises a flow diagram as configured in accordance with various embodiments of the invention.

These and other benefits may become clearer upon making a thorough review and study of the following detailed description. To begin, this description will first present an example of a statistics-based approach to automatically correlating individual RFID tags with corresponding physical locations within a given monitored facility. Referring now to the drawings, and in particular to FIG. 1, for the sake of an illustrative example this description will presume that a control circuit carries out the described activities and that this control circuit has access to coverage information 101 that maps coverage for each of a plurality of RFID-tag readers to physical locations within a given monitored facility.

Figure 2:
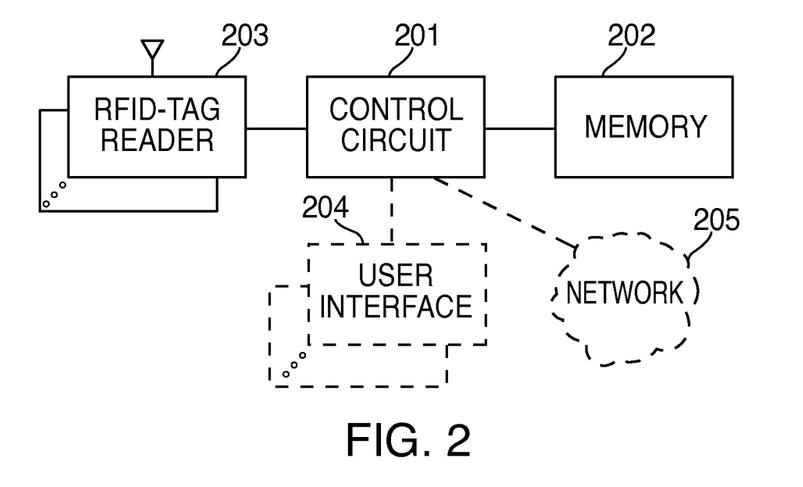
FIG. 2 comprises a block diagram as configured in accordance with various embodiments of the invention.

Referring to FIG. 2, such a control circuit 201 can comprise a fixed-purpose hard-wired platform or can comprise a partially or wholly programmable platform. These architectural options are well known and understood in the art and require no further description here. This control circuit 201 is configured (for example, by using corresponding programming as will be well understood by those skilled in the art) to carry out one or more of the steps, actions, and/or functions described herein.

The control circuit 201 in this example operably couples to a memory 202. The memory 202 may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

This memory 202 can serve, for example, to store the aforementioned coverage information 101. This memory 202 can also serve to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this example the control circuit 201 also operably couples to a plurality of RFID-tag readers 203 that are dispersed about the corresponding monitored facility. A variety of approaches are known in the art in these regards. It will be presumed here that at least some of the RFID-tag readers 203 are mounted to or are otherwise suspended from the ceiling of the facility and that at least some of the RFID-tag readers each have a plurality of reader antennas and/or include a steerable phased antenna array.

Figure 3:
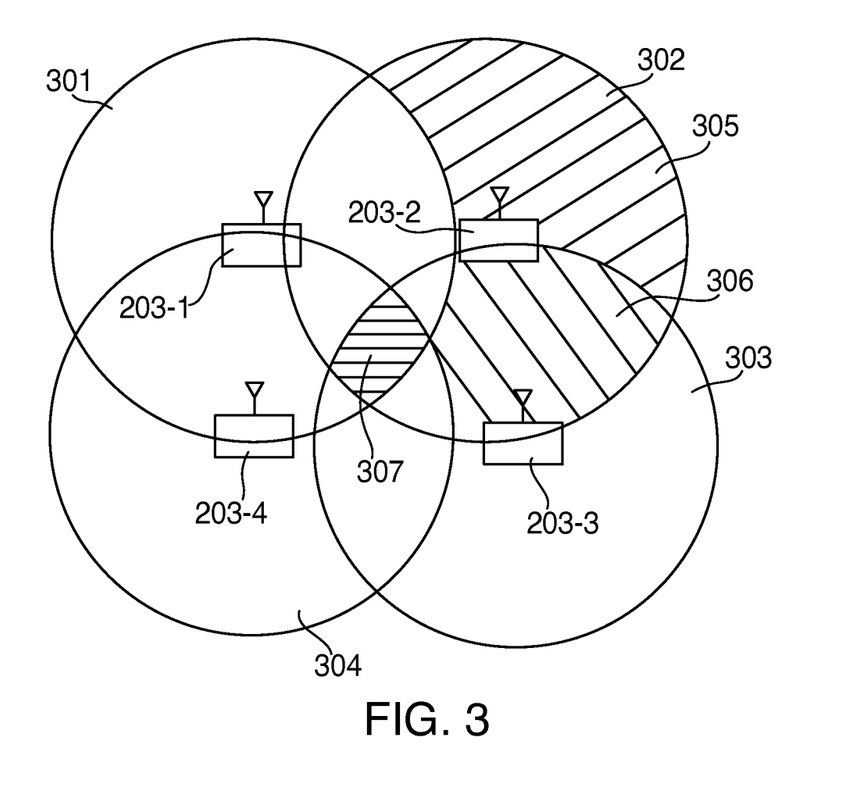
FIG. 3 comprises a top plan schematic view as configured in accordance with various embodiments of the invention.

In a typical application setting the coverage area for each such RFID-tag reader 203 is likely to at least partially overlap with the coverage area of at least one other RFID-tag reader 203. FIG. 3 presents a simplified illustrative example in these regards. In this example there are four RFID-tag readers (denoted by reference numerals 203-1 through 203-4) that are spaced apart from one another and that each have a corresponding coverage area (denoted by reference numerals 301 through 304).

This reference to "coverage area" will be understood to refer to the effective reading coverage area engendered by a particular antenna; i.e., the three-dimensional volume within which the radiated radio-frequency energy is, at least for the most part, of sufficient magnitude to power up an ordinary RFID tag that is used at the facility. It will be understood that this power level will not be consistent throughout a given coverage area (for example, the power level at one area within the coverage area may be less than other areas but still sufficient in and of itself to power up an RFID tag). For many application settings, a suitable power level will be −15 dbm and above.

It will also be understood that the effective coverage area can itself include not only hot spots of higher energy but also nulls where the local energy level is too low to power an RFID tag as described. Nulls and hot spots are the result of the radio-frequency energy reflecting off various surfaces and constructively interfering (hence producing hot spots) or destructively interfering (hence producing nulls). A further nuance is that such nulls and hot spots can alternate from one wave length to another. The presence of such nulls within such a volume shall be understood to not alter a fair characterization of such a volume as comprising an effective "coverage area" for a given RFID-tag reader 203.

As illustrated in FIG. 3, coverage areas for different RFID-tag readers 203 can occur and vary in any of a variety of ways. The area denoted by reference numeral 305 as comprises a part of the coverage area 302 for the RFID-tag reader denoted by reference numeral 203-2 only receives energy from that one RFID-tag reader 203-2. The area denoted by reference numeral 306, however, represents overlap between two different coverage areas 302 and 303 as correspond to two different RFID-tag readers 203-2 and 203-3. And the area denoted by reference numeral 307 represents overlap between all four coverage areas 301 through 304.

The present teachings presume an a priori understanding, at least to some useful degree, of the coverage areas as apply with respect to a given monitored facility. This understanding includes an understanding of the location of the RFID-tag readers 203 within the facility and the general metes and bounds of the three-dimensional coverage areas as correspond to each such RFID-tag reader 203. If desired, such information can be developed using an empirical approach that provides for taking readings at various locations within the facility to thereby determine these boundaries and volumes. By another approach, in lieu of the foregoing or in combination therewith, such information may be developed or refined over time and during ordinary use of the RFID system when and as appropriate.

Figure 4:
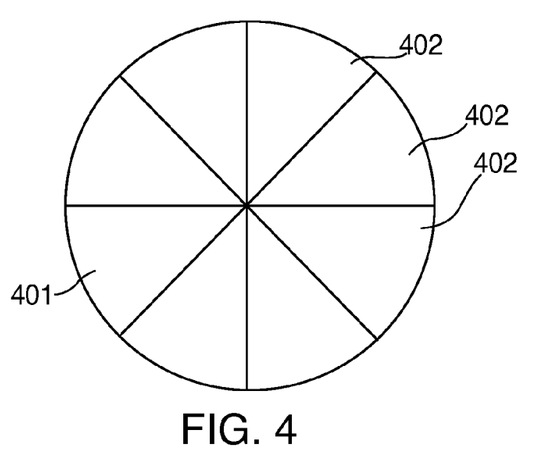
FIG. 4 comprises a top plan schematic view as configured in accordance with various embodiments of the invention.

As noted earlier, a given RFID-tag reader 203 can have a plurality of antennas and/or can include a steerable phased antenna array. In either case the coverage area for a given RFID-tag reader 203 can be further subdivided as function of those various antennas (or sectors). FIG. 4 presents, for example, a coverage area 401 for an RFID-tag reader 203 having eight antennas equally distributed about its periphery to thereby define eight sectors 402 that together comprise the complete coverage area 401 for this RFID-tag reader 203. (In fact, in many such application settings, there can be coverage overlap between, for example, adjacent antennas. Accordingly, if desired, the coverage information for such an RFID-tag reader 203 can also account for adjacent-antenna overlapping coverage areas if desired.)

Figure 5:
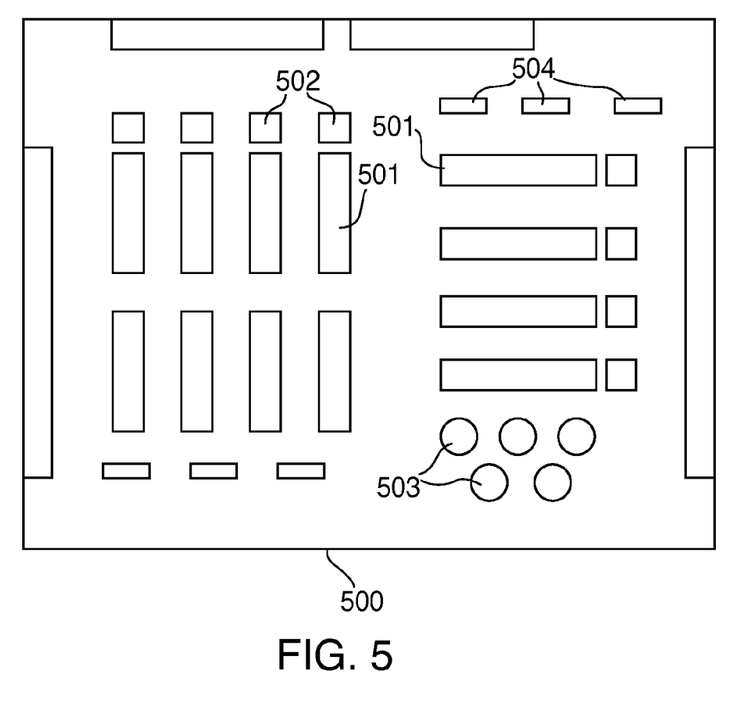
FIG. 5 comprises a top plan schematic view as configured in accordance with various embodiments of the invention.

The foregoing information regarding the metes and bounds of the coverage areas for each of the aforementioned RFID-tag readers 203 are then mapped to the actual physical locations of the monitored facility. For the sake of an illustrative example FIG. 5 presents a simple map for a facility 500 that comprises a retail sales establishment. This facility 500 includes a variety of different product displays including a plurality of shelves 501, so-called end-cap displays 502, racks 503, and free-standing presentations 504. The aforementioned coverage information 101 comprises a to-scale merger and registration of the physical location information of such a facility 500 with the coverage area information as corresponds to the various RFID-tag readers 203 at this facility 500.

Referring again to FIG. 2, if desired, the control circuit 201 can also operably couple to one or more user interfaces 204 and one or more communication networks 205. This user interface 204 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user. The network 205, in turn, can comprise any of a variety of internal and/or external networks including intranets and extranets (such as but not limited to the Internet).

Referring again to FIG. 1, at 102 such a control circuit 201 uses the plurality of RFID-tag readers 203 to read, over time and often many times, a population of RFID tags. The control circuit 201 then stores historical-read information as pertains to these reads.

By one approach this historical-read information includes corresponding RFID-system metrics. Examples of such metrics include but are certainly not limited to a particular RFID-tag reader (that is, an identifier for the particular RFID-tag reader that read the RFID tag), a particular RFID-tag reader antenna (for example, when the RFID-tag reader antenna for a given RFID-tag reader comprises a plurality of sectored antennas), a particular RFID-tag reader logical antenna (for example, when the RFID-tag reader makes use of a steerable phased antenna array), a received signal strength indicator (RSSI) value as corresponds to the read response provided by the RFID tag when read, a received signal phase angle as corresponds to the read event, and/or a total number of reads to note but a few examples in these regards.

This historical-read information can also include tag-specific information regarding each read RFID tag. This tag-specific information can include, for example, a unique electronic product code as specified by the aforementioned standard denoted as EPC Radio-Frequency Identity Protocols Class-1 Generation-2 UHF RFID Protocol for Communications at 860 MHz-960 MHz Version 1.0.9. Such an EPC code, of course, will serve to uniquely identify each RFID tag and thereby serve to distinguish read RFID tags from one another.

And, if desired, the historical-read information can also include a corresponding timestamp to denote the time at which each read occurred. The granularity of this timestamp can be as course or as fine as may be desired. Generally speaking, for many application settings it may suffice if the timestamp is accurate to within plus or minus 0.01 seconds. In other cases it may be sufficient to simply know, for example, the hour of the day when the read occurred.

Over time, this historical-read information will contain multiple reads for some (but perhaps not all) of the same RFID tags. This historical-read information will therefore illustrate what RFID-system metrics remain generally the same for a given RFID tag and which have varied over time. As a very simple example in these regards, TABLE 1 presents historical-read information as regards which of two RFID-tag readers 203 read either of two RFID tags (i.e., RFID-tag 001 and RFID-tag 002).

TABLE 1

| TAG ID | READER A | READER B |
|---|---|---|
| 001 | X | |
| 001 | X | |
| 002 | X | |
| 001 | X | |
| 002 | | X |
| 001 | X | |
| 002 | | X |
| 002 | | X |

This historical-read information reveals that, over the time period in question, RFID-tag 001 was read four times, each time by RFID-tag reader A, while RFID-tag 002 was also read four times, once by RFID-tag reader A and three times by RFID-tag reader B. This historical-read information also reveals that all three of the most recent reads for RFID-tag 002 were by RFID-tag reader B. (It will be understood that this example is highly simplified; as noted above the data items that comprise the historical-read information can be considerably more complete, varied, nuanced, and rich.)

At 103 the control circuit 201 uses the historical-read information as corresponds to a given period of time of interest (such as a specified hour, day, week, or such other period of contiguous time as might be of interest in a given application setting) and the aforementioned coverage information 101 to determine sub-groups of the population of RFID tags. The specific nature of the sub-groups can vary as desired. For the sake of an illustrative example it will be presumed here that the sub-groups are defined, at least in part, by product-based categories. For example, these product-based categories can comprise Universal Product Code categories as are known in the art (such as, but not limited to, the UPC-A which consists of 12 numerical digits that identify both the manufacturer and the generic (rather than individual) trade item).

In some cases this product categorization information may be provided by the RFID tag itself as part of its tag-specific information. In other cases, the unique identifier provided by the RFID tag as part of its tag-specific information can be used to look-up the product categorization as corresponds to this particular RFID tag.

More specifically, this activity at 103 serves to identify groupings of RFID tags as correspond to given product types and the corresponding physical locations of those product-based groupings within the facility 500. By way of some very simple examples, at 103 the control circuit 201 can determine that Brand ABC jeans are kept at a first physical location in the facility 500, Brand DEF shaving cream is kept at a second, different physical location in the facility 500, and Brand GHI toasters are kept at a third, different-again physical location in the facility 500.

These determinations can, of course, be more subtle in some cases. The control circuit 201 can determine, for example, that the sub-groups include two different groupings of the same item, albeit at two different locations. For example, one sub-group of Brand ABC jeans might be located on a shelf at a first physical location and a second sub-group of Brand ABC jeans might be located in an end-cap display at a second, different physical location. Consider, for example, the historical-read information presented in TABLE 2.

TABLE 2

| TAG ID | READER A | READER B |
|--------|----------|----------|
| 001 | 95% | 5% |
| 002 | 93% | 7% |
| 003 | 25% | 75% |
| 004 | 92% | 8% |
| 005 | 20% | 80% |
| 006 | 96% | 4% |
| 007 | 18% | 82% |
| 008 | 5% | 95% |
| 009 | 95% | 5% |

In TABLE 2, the number of reads have been aggregated for each RFID tag for each product category (in this case, say, Brand ABC jeans) and that information used to determine the percentage of reads for each RFID tag in this sub-group that were by RFID-tag reader A and that were by RFID-tag reader B. For RFID-tag 001, for example, 95% of the reads were by RFID-tag reader A and 5% of the reads were by RFID-tag reader B. A review of the data indicates that the RFID tags of this sub-group are likely located at one of two physical locations, with a first physical location having RFID tags 001, 002, 004, 006, and 009 and with a second physical location having RFID tags 003, 005, 007, and 008.

In any event, to this point in the process, the control circuit has formed sub-groupings (such as product-based sub-groupings) of the RFID tags in the facility 500 based on, at the least, the aforementioned historical-read information and the coverage information 101 and those sub-groups have been associated with specific physical locations in the facility 500.

At 104, the control circuit 201 then uses the historical-read information 101 to calculate at least one aggregated RFID-system metric on a sub-group level basis for at least some of the determined sub-groups. An example in these regards is to calculate an average value for a given one of the RFID-system metrics for members of the sub-group. As a very simple but illustrative example in these regards, the average values for the RFID tags for the two sub-groups of Brand ABC jeans detailed in TABLE 2 could be averaged to yield the result shown in TABLE 3.

TABLE 3

| SUB-GROUP | READER A | READER B |
|-----------|----------|----------|
| ABC jeans sub-group 1 | 94.2% | 5.8% |
| ABC jeans sub-group 2 | 17% | 83% |

In effect, the control circuit 201 determines a profile comprising an aggregated view of one or more RFID-system metrics for RFID tags that comprise a specific sub-group. As noted above, the breadth and depth of these RFID-system metrics can be considerable and as a result the corresponding profiles can be multi-faceted and multi-dimensional. And, since the sub-groups themselves are correlated to physical locations within the facility 500, so too are these RFID-system metrics profiles.

By one approach, the control circuit 201 can conduct and re-conduct the aforementioned actions on as frequent a basis as might be wished. When re-conducting the actions, the control circuit 201 can use a same sampling period as was used in previous process cycles or can use different sampling periods if desired. For example, if it is known that significant changes were recently made to the sales floor (for example, to accommodate some significant quantity of seasonal offerings), it may be useful to restrict the sample period to only relatively recent reads. When significant changes to the presentation of stock have not likely happened, however, it can be useful to utilize relatively long sample periods.

These RFID-system metrics profiles can be utilized and leveraged in a wide variety of ways. As but one simple illustrative example in these regards, at 105 the control circuit 201 can optionally use the at least one aggregated RFID-system metric to determine a location of a particular RFID tag by comparing the at least one aggregated RFID system metric to read-based information regarding this particular RFID tag.

Consider, for example, an RFID tag that is read for only the very first time on the sales floor of the facility 500 by RFID-tag reader A. The tag-specific information provided by the RFID tag, when read, can serve to associate this RFID tag with a particular product offering. When that product offering is a pair of Brand ABC jeans, the control circuit 201 can then reference, for example, the information in TABLE 3. Since this RFID tag was read by RFID-tag reader A, the statistical likelihood is that the RFID tag is associated with a pair of jeans that is part of the ABC jeans sub-group 1 rather than the ABC jeans sub-group 2. The control circuit 201 can then, with a considerable degree of reliability, determine the location of this particular RFID tag to be the same location as the ABC jeans sub-group 1. If and as additional reads for this particular RFID tag become available, those additional reads will provide further data to confirm, or to correct, that conclusion.

As another example, the disclosed historical information provides metrics that can be grouped by utilizing the aforementioned product categorizations. Accordingly, information metrics provided by a particular read RFID tag can be compared to the metrics for all the product-based sub-groups to identify when the item that corresponds to that particular RFID tag is physically out of place as well as where instead that item presently resides to facilitate having an associate find and transfer that item to its appropriate display area.

So configured, an RFID system in a given facility can readily and reliably correlate individual RFID tags with specific physical locations notwithstanding any specific information from the RFID tags regarding such locations and even when potentially lacking much of a read history for any particular RFID tag. That said, however, a great number of variables can be in play that can affect how well such an approach works in a given application setting to reliably associate RFID tags with specific physical locations with a facility.

For example, radio-frequency coverage is not likely to be uniform within a given facility. This lack of uniformity can be owing to any number of factors including but not limited to the shape of the facility itself and the materials used in its construction, the shape and material content of various fixtures within the facility, and local electrical interference due to any of a variety of sources to note but a few examples in these regards. Similarly, RFID tags can have their read behavior affected by the products with which they are associated. Some products (and/or their packaging), for example, can act as electrical shields at least to some extent. Accordingly, the ability of the disclosed automated approach to correctly interpret historical-read information can vary to some extent from place to place within the facility and/or with respect to the product sub-grouping itself.

Figure 6:
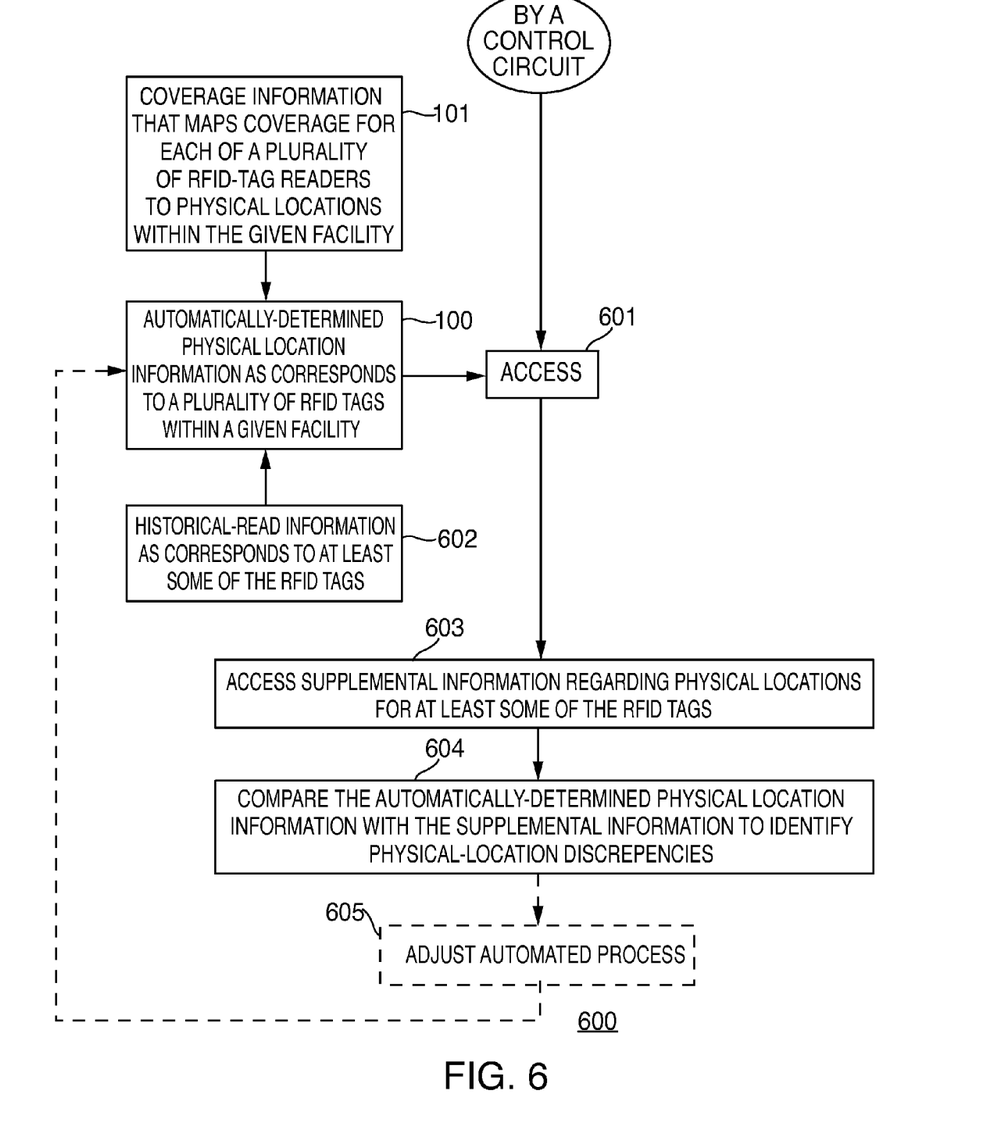
FIG. 6 comprises a flow diagram as configured in accordance with various embodiments of the invention.

FIG. 6 presents a process 600 to help such an automated process correct its abilities over time to correctly associate specific RFID tags with specific physical locations within such a facility.

Pursuant to this process 600 the control circuit accesses, at 601, the aforementioned automatically-determined physical location information as corresponds to a plurality of RFID tags within a given facility as determined by the aforementioned process 100. It will be recalled that this process 100 makes use of the aforementioned coverage information 101 that maps coverage for each of a plurality of RFID-tag readers to physical locations within the given facility as well as historical-read information 602 (such as, but not limited to, the aforementioned RFID-system metrics, tag-specific information, and corresponding timestamps as correspond to RFID-tag reader reads of individual ones of the RFID tags) as corresponds to at least some of the RFID tags.

At 603 the control circuit also accesses supplemental information regarding physical locations for at least some of those RFID tags. These teachings are highly flexible in practice and will accommodate a wide variety of types and sources of such supplemental information.

As a first example, the supplemental information can include information regarding a floor plan-based planogram for at least part of the given facility. Planograms are known in the art and generally comprise visual representations of a store's placement of its products or services. Planograms can assume different forms including diagrams or models that indicate, for example, the placement of retail products on shelves. A planogram can reflect any of a variety of points of view including, for example, a top plan point of view or a side-elevational point of view. Accordingly, a given planogram can indicate, for example, not only where a given product category is displayed in terms of the facility's floor space but where that product category resides vertically in terms of distance from the floor and/or with respect to other product categories that may be placed above or below the product category of interest.

As a second example, the supplemental information can comprise information gleaned from handheld-based RFID-tag readers. For example, facility associates may use handheld RFID-tag readers from time to time to conduct inventories of part or all of a given facility's displayed goods. The handheld-conducted inventories can be relatively thorough and may be able to obtain, in a single reading session, reads from essentially all of the RFID tags for a set of items on a given shelf or that are hanging from a given display rack. At the same time, by any of a variety of approaches those reads can be correlated to specific shelves, racks, displays, endcaps, and/or product groupings.

In a somewhat similar manner, and as a third example, the supplemental information can comprise information gleaned from handheld-based optical-code readers such as handheld barcode readers as are very well known in the art. Whether an associate uses a barcode reader expressly to develop such information for the purposes of this process 600 or for some other reason, again, such associate-based inventorying can be correlated by any of a variety of ways with specific locations with the facility.

As a fourth example, the supplemental information can comprise information gleaned from video analytics. By one approach, for example, this information can be based upon in-facility security video cameras that are mounted at various locations within the facility. By use, for example, of pattern-matching algorithms of choice such video content can be processed to identify various display infrastructure (such as shelves, racks, and so forth), various product offerings, and specific locations within the facility. By one approach, for example, certain known locations within the store can be marked with a visual indicator that such an approach can utilize as a known physical-location marker by which the physical location of other recognized items can be ascertained at least to some useful extent.

And as a fifth example, the supplemental information can comprise information received through location reviews from customers or associates themselves. Such information can be gathered using any of a wide variety of formal and informal approaches. By one very simple approach, for example, a kiosk or other user interface can be provided at which an interested party can present a found, misplaced item to be read (either via an RFID-tag reader or via an optical code) and where this party can mark on an interactive map where they found the item.

With continued reference to FIG. 6, at 604 the control circuit then compares the automatically-determined physical location information with the supplemental information to identify physical-location discrepancies. Such an activity can include, for example, comparing automatically-determined physical location information for a given RFID-tagged item with the supplemental information to identify that the RFID-tagged item was not where the automatically-determined physical location information had placed that item.

By one approach, discrepancies may not be identified as being significant and/or of interest unless and until the identified discrepancy is greater than some predetermined magnitude. For example, it may be a process requirement that a physical discrepancy be at least three feet in magnitude before that discrepancy will be considered an anomaly of interest for the purposes of this process 600. (Other distances, both shorter and longer, may provide more appropriate in a given application setting.) To the extent that the process 600 applies such a threshold, these teachings will accommodate using different threshold distances to accommodate different circumstances. For example, different distances may apply depending upon whether the location discrepancy is in a direction that is parallel to a given shelf or is lateral to that same shelf.

The overall system can employ the developed information regarding detected physical-location discrepancies as desired. By one approach, for example, a simple archival record of such discrepancies can be updated and maintained for future study and use. By another approach, the facility's record regarding the physical location of various items can simply be updated to reflect corrected location information. And by another approach, and as illustrated at 605, this process 600 can provide for using the physical-location discrepancy information to adjust the aforementioned automated process 100 to thereby improve the accuracy of the automated process.

Using the discrepancy information as feedback to adjust and improve the primary process 600 can proceed in a variety of ways. By one simple approach, for example, this adjustment can comprise automated changes to any of a variety of algorithm parameters. The validity of such changes can then be automatically tested by continued reapplication of the process 600 shown in FIG. 6. By another approach, and as experience with such systems grows, the adjustment activity can itself implement one or more analysis algorithms of choice that more specifically tune the functioning of the primary process 600 in view of the discrepancy information.

So configured, a statistics-based process for, amongst other things, determining the physical location of RFID tags (and their corresponding items) can be corrected and improved over time to reflect unique circumstances within the corresponding facility that are otherwise distorting the understanding of where items in the facility are located. These teachings are highly flexible in practice and will accommodate a wide variety of supplemental information types, modalities, and gathering paradigms.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method comprising:
by a control circuit:
  accessing automatically-determined physical location information as corresponds to a plurality of radio-frequency identification (RFID) tags on tagged objects within a given facility, wherein the automatically-determined physical location information is automatically determined using:
    coverage information that maps an RFID tag-read coverage area for each of a plurality of fixed-location RFID-tag readers to physical locations within the given facility; and
    historical-read information by the RFID-tag readers as corresponds to at least some of the RFID tags;
  accessing supplemental information regarding physical locations for at least some of the RFID tags, wherein the supplemental information comprises:
  a floor plan-based planogram for at least part of the given facility;
  tagged objected information gleaned from handheld-based RFID-tag readers deployed in the given facility;
  location and inventory information gleaned from handheld-based optical-code readers deployed in the given facility;
  location and object information gleaned from video analytics of the given facility; and
  object location information received through location reviews of the given facility from customers; and
  comparing the automatically-determined physical location information with the supplemental information to thereby identify physical-location discrepancies.

2. The method of claim 1 wherein the historical-read information comprises, at least in part, RFID-system metrics along with tag-specific information and corresponding timestamps as correspond to RFID-tag reader reads of individual ones of at least some of the RFID tags.

3. The method of claim 2 wherein the RFID-system metrics include at least one of:
  a particular RFID-tag reader;
  a particular RFID-tag reader antenna;
  a particular RFID-tag reader logical antenna;
  a received signal strength indicator (RSSI) value;
  a received signal phase angle; and
  a total number of reads.

4. The method of claim 1 wherein comparing the automatically-determined physical location information with the supplemental information to thereby identify physical-location discrepancies comprises comparing the automatically-determined physical location information with the supplemental information to thereby identify physical-location discrepancies of greater than a predetermined magnitude.

5. The method of claim 4 further comprising:
  using the physical-location discrepancies to adjust an automated process by which the automatically-determined physical location information is automatically determined to thereby improve accuracy of the automated process.

6. The method of claim 5 wherein using the physical-location discrepancies to adjust an automated process by which the automatically-determined physical location information is automatically determined comprises automatically using the physical-location discrepancies to adjust an automated process by which the automatically-determined physical location information is automatically determined.

7. An apparatus comprising:
  a plurality of radio-frequency identification (RFID) tags tagged to objects, and
  a control circuit configured to:
  access automatically-determined physical location information as corresponds to the plurality of RFID tags of tagged objects within a given facility, wherein the automatically-determined physical location information is automatically determined using:
    coverage information that maps an RFID tag-read coverage area for each of a plurality of fixed-location RFID-tag readers to physical locations within the given facility; and
    historical-read information by the RFID tag readers as corresponds to at least some of the RFID tags;
  access supplemental information regarding physical locations for at least some of the RFID tags, wherein the supplemental information comprises:
  a floor plan-based planogram for at least part of the given facility;
  tagged object information gleaned from handheld-based RFID-tag readers deployed in the given facility;
  location and inventory information gleaned from handheld-based optical-code readers deployed in the given facility;
  location and object information gleaned from video analytics of the given facility; and
  object location information received through location reviews of the given facility from customers; and
  compare the automatically-determined physical location information with the supplemental information to thereby identify physical-location discrepancies.

8. The apparatus of claim 7 wherein the historical-read information comprises, at least in part, RFID-system metrics along with tag-specific information and corresponding timestamps as correspond to RFID-tag reader reads of individual ones of at least some of the RFID tags.

9. The apparatus of claim 8 wherein the RFID-system metrics include at least one of:
  a particular RFID-tag reader;
  a particular RFID-tag reader antenna;
  a particular RFID-tag reader logical antenna;
  a received signal strength indicator (RSSI) value;
  a received signal phase angle; and
  a total number of reads.

10. The apparatus of claim 7 wherein the control circuit is configured to compare the automatically-determined physical location information with the supplemental information to thereby identify physical-location discrepancies by comparing the automatically-determined physical location information with the supplemental information to thereby identify physical-location discrepancies of greater than a predetermined magnitude.

11. The apparatus of claim 10 wherein the control circuit is further configured to automatically use the physical-location discrepancies to adjust an automated process by which the automatically-determined physical location information is automatically determined to thereby improve accuracy of the automated process.

* * * * *